May 6, 1969     G DE G. COWAN     3,442,119
ULTRASONIC SEARCH WHEEL ASSEMBLY
Filed Oct. 11, 1965     Sheet 1 of 4
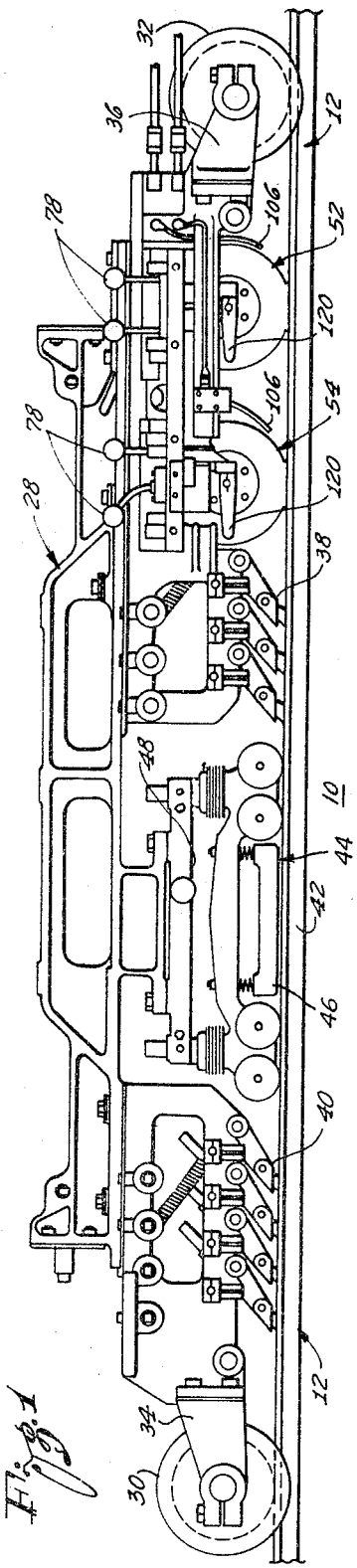
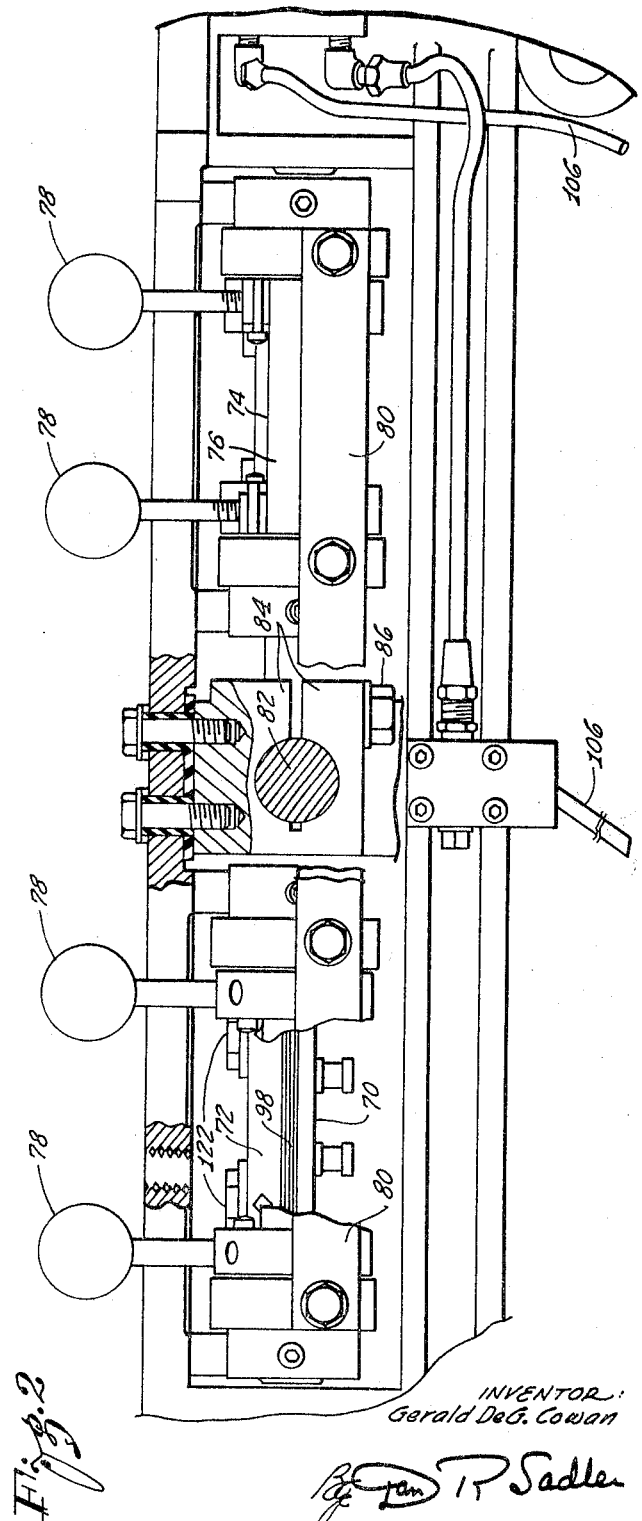
INVENTOR:
Gerald DeG. Cowan
Attorney

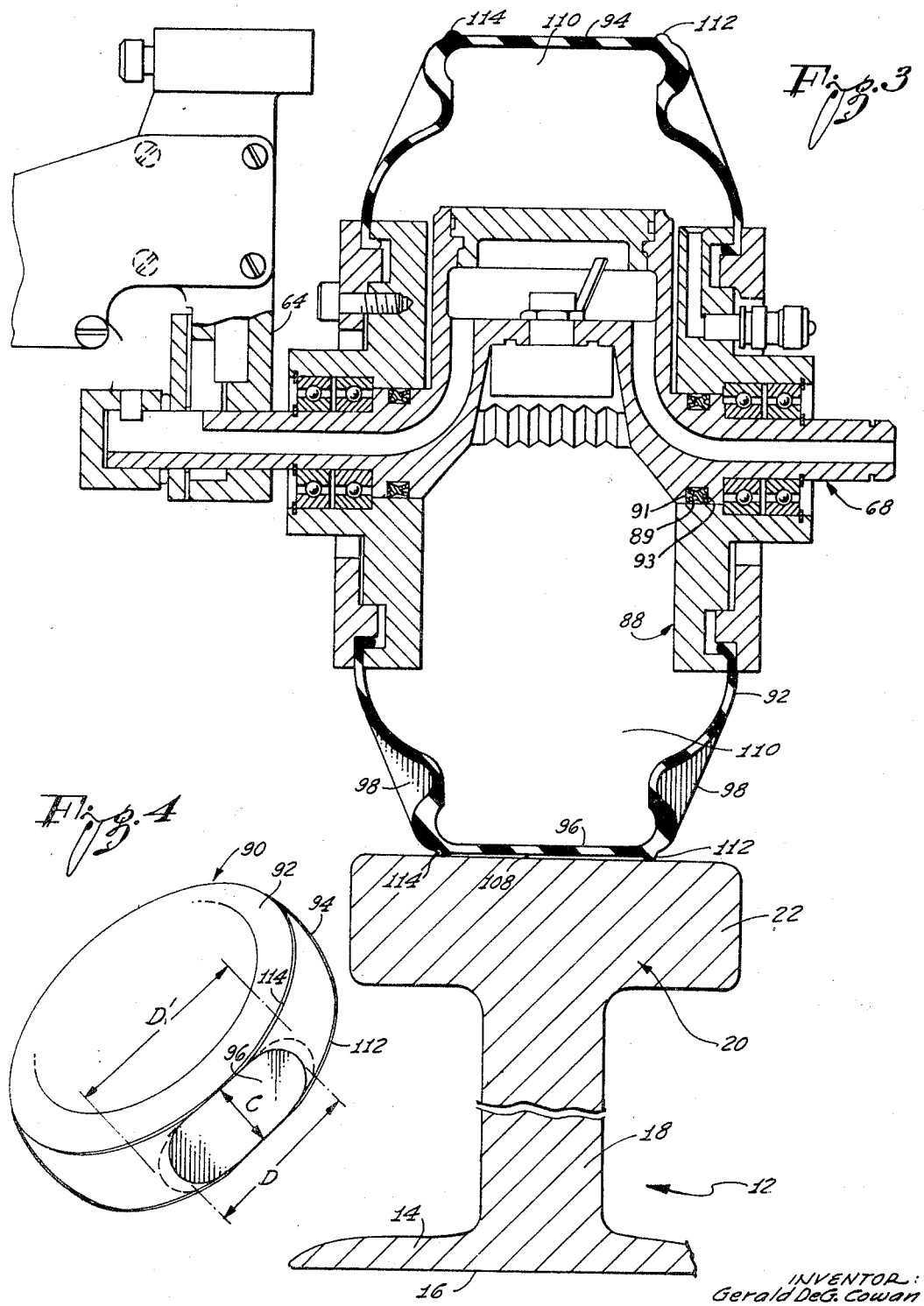

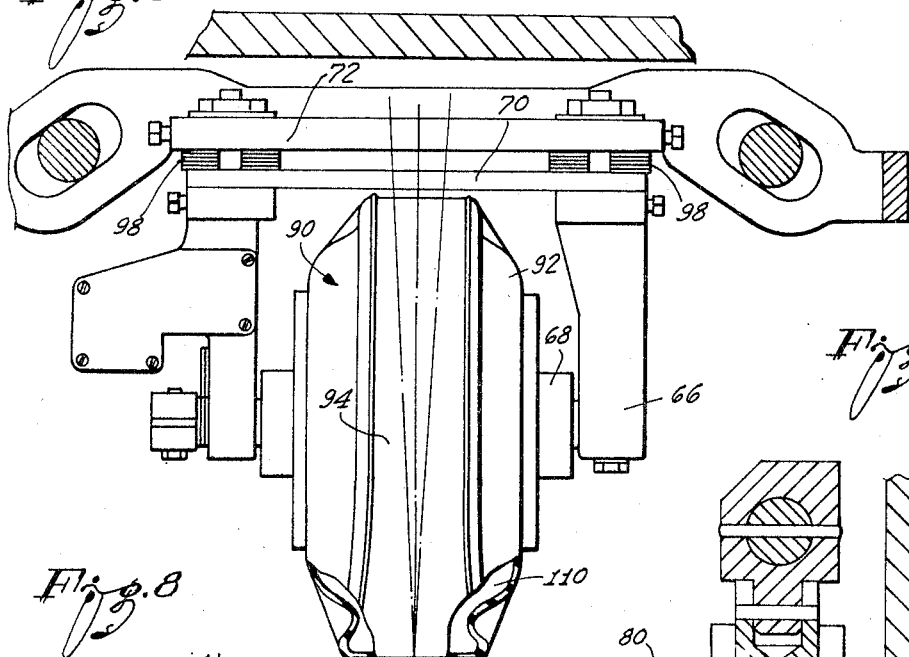
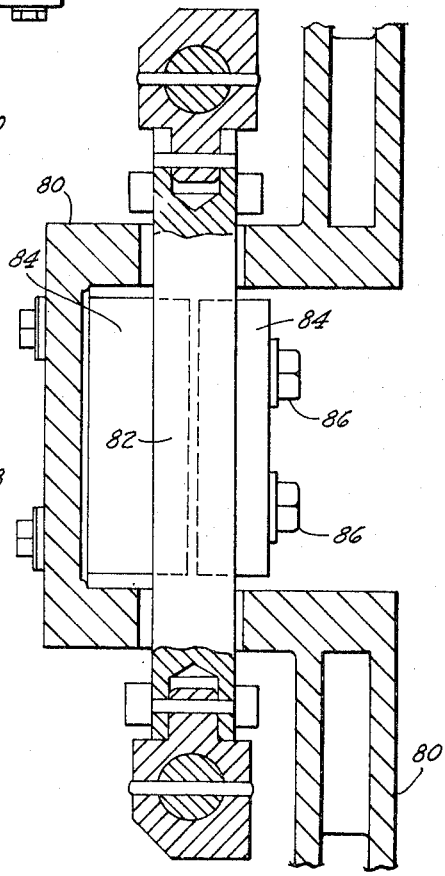
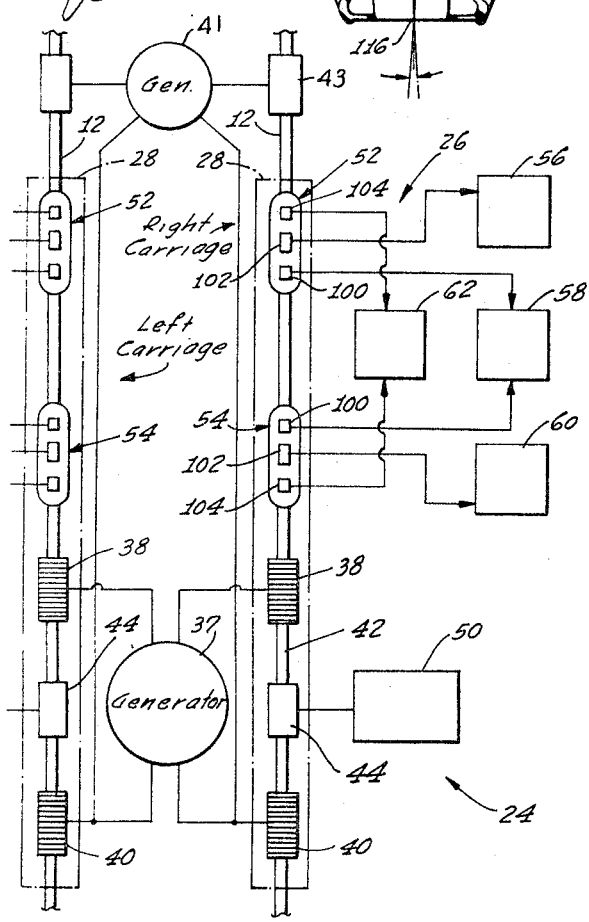

3,442,119
ULTRASONIC SEARCH WHEEL ASSEMBLY
Gerald de G. Cowan, New Preston, Conn., assignor to Automation Industries, Inc., El Segundo, Calif., a corporation of California
Filed Oct. 11, 1965, Ser. No. 494,977
Int. Cl. G01n 9/24
U.S. Cl. 73—67.5　　　　　　　　　　　　　12 Claims

ABSTRACT OF THE DISCLOSURE

The nondestructive testing system disclosed herein is particularly adapted for simultaneously ultrasonically and inductively inspecting railroad rails for internal defects. An ultrasonic search wheel is provided which includes a tire with reinforced sidewalls and ribs on the tread for maintaining the wheel acoustically coupled to the rail at all times. Means are also provided for maintaining the wheel search unit and inductive pickup properly oriented with the rail at all times.

---

For economic reasons the rails employed in railroad tracks are normally designed as light a weight as possible. This results in the rails being heavily stressed, particularly when a heavily loaded train is traveling over the track. As a consequence after a period of time the rails tend to develop various types of defects such as cracks etc. If the defects are not detected at an early date, the repeated loading and flexing of the rail causes the defects to "grow" until the rail separates or otherwise fails. Such a failure normally leads to a derailment of the train with a consequent large economic loss and sometimes even the loss of life.

In order to avoid such failures it has become customary to periodically inspect the rails for defects. The most successful means employs a combination of induction testing and ultrasonic testing. In one form of induction testing system a pair of electrical brushes ride on the head of the rail and circulate an electrical current therethrough as the system travels along the track. The current is of sufficient magnitude to form a strong magnetic flux field around the rail. Any discontinuities in the rail cause the current flow to be disturbed and the surrounding flux field to be distorted. An inductive pickup positioned between the brushes and immediately adjacent the head of the rail senses any distortions in the magnetic flux field. In order to make an effective inductive test the electrical brushes should properly contact the rail whereby the current is maintained substantially constant. In addition, the inductive pickups must be properly positioned with respect to the rail in order to accurately sense the distortions in the magnetic flux field.

In one form of ultrasonic system one or more ultrasonic search units such as a search wheel are employed. Such a wheel includes a flexible tire that rolls along the head of the rail with the portion in contact with the rail forming a "flat." Transducers inside of the wheel are focused on the "flat" so as to be acoustically coupled to the rail. Ultrasonic energy is thereby transmitted through the "flat" and into the rail and any echoes reflected from within the rail are coupled back through the "flat" to the transducers.

In order to make an effective ultrasonic test it is essential that the "flat" formed in the tire tread be intimately acoustically coupled to the surface of the rail. One means of improving the acoustical coupling is to impose a sufficient mechanical force on the wheel to maintain the "flat" tightly compressed against the rail. Another means has been to apply a liquid to the tire and/or rail so as to form a film of acoustically conductive liquid between the "flat" and the surface of the rail. In order to make an effective test the various transducers etc. should also be properly aligned with the "flat" and the adjoining portions of the rail whereby the ultrasonic energy reaches all of the desired portions of the rail and any echoes are returned to the proper transducer.

Although foregoing induction and ultrasonic test systems have been eminently successful in testing rails, they have been subject to several severe operational difficulties when employed on a commercial basis. One difficulty is maintaining the current brushes, inductive pickups and ultrasonic wheels all properly aligned with the head of the rail and consistently coupled thereto in a uniform manner for several reasons. First of all, it has been found that the weight or size of the rail frequently varies even on the same railroad line. This is due to several factors such as variations in the road bed, variations in the load (for example in and around a curve) etc. It has also been found that some portions of the rail, and particularly the gauge tend to wear extensively. These variations in the dimensions of the rail have made it extremely difficult, if not impossible, to maintain the brushes, inductive pickups and ultrasonic wheels all properly aligned with the rails without frequently stopping the test to make adjustment. Moreover, the adjustments have been very difficult and time consuming to make.

The ultrasonic portion of the system has been particularly troublesome. It has also been found that under some operating conditions the ultrasonic search wheel will not remain properly coupled to the surface of the rail. Under some circumstances (for example at the higher test speeds), the wheel stops rotating. The wheel merely skids or planes on top of the film of coupling fluid. Also there is a tendency for a heavily loaded wheel to act somewhat as a squeegee and force the coupling fluid laterally outwardly from the sides of the tread. Furthermore, it has been found that due to the variations in such factors as the dimensions of the rails, misalignment of the abutting ends of adjacent rail sections, variations in the loading on the wheel, variations in the rolling radius of the tire etc. the size of the "flat" and its position relative to the transducers varies. Since the "flat" forms a critical part of the ultrasonic energy path to and from the rail head variations in the "flat" cause corresponding variations in the acoustical coupling between the transducers and rail.

It will thus be seen that although prior rail testing systems have been successful in detecting and locating defects they have not ben entirely satisfactory. They possess several disadvantages that have tended to limit their usefulness and the speed at which they can operate.

The present invention provides means for overcoming the foregoing difficulties and limitations. More particularly, the present invention provides nondestructive testing means capable of more uniformly and reliably inductively and ultrasonically testing railroad rails in track at high operating speeds. This is accomplished by providing means that are effective to maintain the current brushes and pickups, etc., all properly aligned with and coupled to the rail regardless of the operating conditions. The means are also effective to maintain the ultrasonic search wheel in proper rolling relationship with the rail and acoustically coupled thereto at all times.

In the single embodiment of the present invention disclosed herein this is accomplished by providing a test carriage which is adapted to be mounted on the underside of a railroad test car which runs on the tracks being tested. The carriage is capable of being lowered onto the rail for traveling along the rail. The carriage includes guide wheels that roll along the head of the rail and maintain the carriage aligned therewith. The pickup units and related components are mounted on the carriage and carried thereby so as to be maintained properly aligned and coupled to the rail at all times. In addition, a new and novel ultrasonic search unit is provided.

The ultrasonic search unit includes a wheel having a pliable tire that rolls on the head of the rail and maintains a constant and uniform coupling between the transducers and the rail. More particularly the tire is effective to maintain a film of liquid couplant trapped between the "flat" and the rail while at the same time creating a sufficient frictional drag to insure the wheel rotating. The tire is also effective to maintain the "flat" properly dimensioned and positioned to provide an optimum acoustical coupling between the transducers in the wheel and the rail.

These and other features and advantages of the present invention will become readily apparent from the following detailed description of the single embodiment of the invention disclosed herein, particularly when taken in connection with the accompanying four sheets of drawings wherein like reference numerals refer to like parts and wherein:

FIGURE 1 is a side view of a rail test carriage embodying one form of the present invention;

FIGURE 2 is a fragmentary side view, on an enlarged scale, of a portion of the carriage of FIGURE 1;

FIGURE 3 is a traverse cross sectional view of an ultrasonic wheel search unit mounted on the test carriage of FIGURE 1;

FIGURE 4 is an isometric view of a tire employed on the wheel search unit of FIGURE 3;

FIGURE 6 is an end view, on a reduced scale, of the wheel search unit illustrating one form of adjustment of the wheel;

FIGURE 7 is a fragmentary cross sectional view of an adjusting means for the wheel search unit; and FIGURE 8 is a diagramatic view of a test system embodying the present invention and employing the rail test carriage of FIGURE 1.

Figure 5:
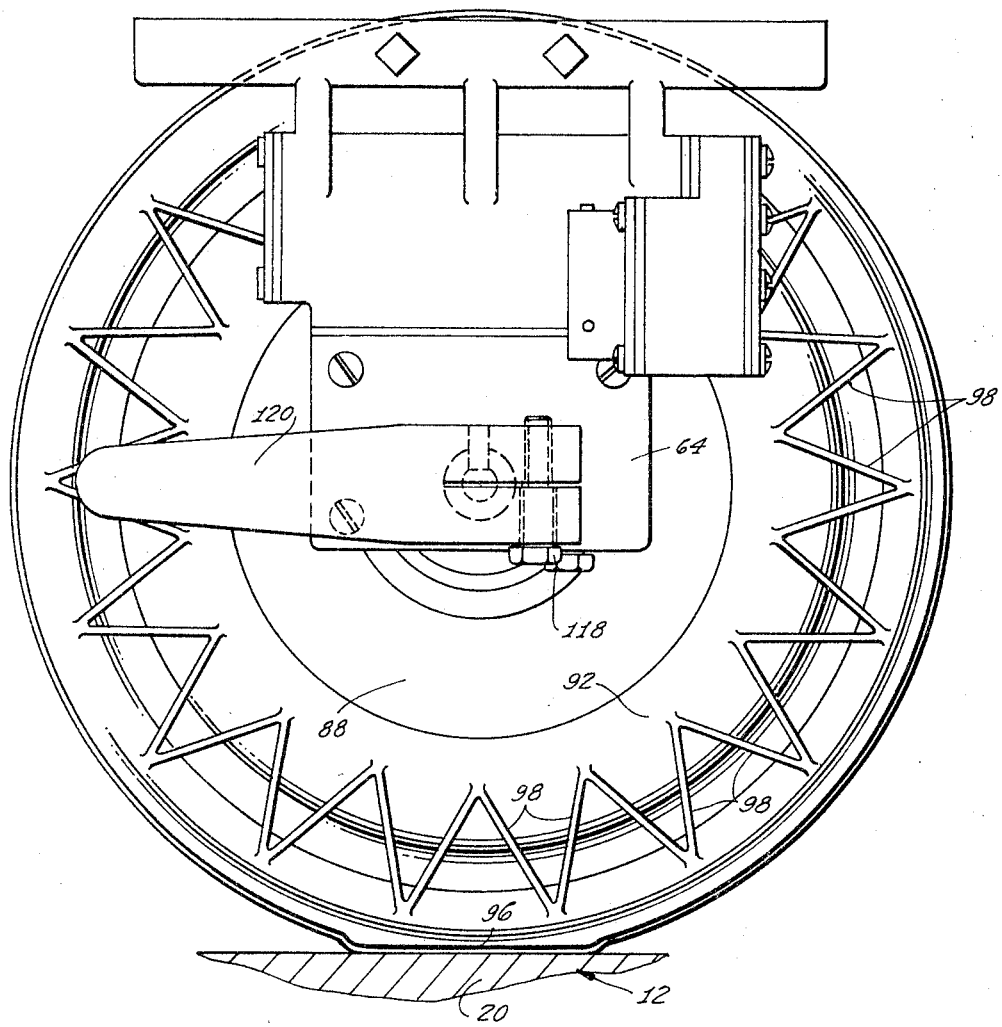
FIGURE 5 is a side view of the wheel search unit.

Referring to the drawings in more detail, the present invention is particularly adapted to be embodied in a test system 10 for testing rails such as are commonly employed in railroad tracks. The rails 12 are of more or less standardized design similar to that in FIGURE 3 and have a flanged base 14 with a horizontal bottom 16, a web 18 that projects vertically upwardly from the center of the base 14 and a head 20 on top of the web 18. The base 14 is normally secured to wooden ties by means of spikes. The railroad cars are carried by flanged wheels that roll on the top of the head 20. Radial flanges ride against the gauge 22 of the head 20 and maintain the wheels properly positioned on the head 20.

For economic reasons it is customary to employ rails that are just adequate to safely carry the load. As a consequence the size of the rail 12 varies in different parts of a track. For example, a large size rail is normally employed in and around curves, over certain types of road beds and those areas where the cars are heavily loaded. Small size rails are employed where there are few, if any, heavily loaded cars. The changing rail sizes result in changes in the dimensions of the rail. It is also to be noted that the rail wears, particularly in and around the gauge 22 and this produces further variations in the dimensions and proportions of the rails, particularly in and around the gauge 22.

In the event a segment of the rail 12 is not firmly anchored to a sound tie, the rail 12 tends to move up and down. The resultant bending and flexing of the rail 12 not only increases the stresses in the rail but also allows its position to change over a wide range. In the event the unanchored segment is near the end of the section, the end will move up and down as the cars roll on and off the section. The motion may cause the abutting ends of adjacent sections to move several inches. This misalignment is of a major magnitude and leads to considerable "battering" as the wheel rolls onto the section of rail.

As a result it can be appreciated that it is extremely important to test the end region of the rail 12 so as to detect any defects therein. However, because of the misalignment of the ends it has been extremely difficult, if not impossible, to maintain the test equipment properly coupled to the rail 12 in this critical region.

From the foregoing comments it is apparent that a rail is subjected to severe operating conditions and even a structurally perfect rail may eventually develop a defect. Normally these defects are in the form of cracks which extend through various portions of the rail 12 such as the head 20, the web 18 and in the region of the junction between the head 20 and the web 18. Initially the defects are quite small and have a relatively minor effect on the strength of the rail 12. However, the defects grow as a result of repeated loadings and may eventually cause a complete failure of the rail 12. In order to avoid such failures it is essential that the rails be periodically inspected and the defects located before they reach a critical size.

The present test system 10 is particularly adapted for inspecting railroad rails in track at a high rate of speed and locating the defects before they have an opportunity to grow to a dangerous size. As best seen in FIGURE 8 the test system 10 includes a first portion 24 for inductively testing both of the rails in a track and a second portion 26 for simultaneously ultrasonically testing both of the rails. The various pickup means for both portions 24 and 26 of the system 10 are mounted on separate carriages 28 that are adapted to travel along the two rails 12.

The two carriages 28 may be mounted on the underside of a test vehicle which propels itself along the track. Each carriage 28 (best seen in FIGURE 1) is normally mounted for movement between a raised or retracted position and a lowered or test position. When the test vehicle is traveling from one test sight to another each carriage 28 may be lifted into the retractable position whereby the carriage and all of the test equipment mounted thereon are lifted clear of the rail 12. During a testing operation one or both of the carriages 28 are lowered into the test positions whereby the carriage 28 will travel along the rail.

In order to assist in positioning the carriage 28 with respect to the rail, front and rear guide wheels 30 and 32 are provided. The guide wheels 30 and 32 are mounted on brackets 34 and 36 which extend beyond the ends of the carriage 28 and position the wheels 30 and 32 on the head 20 and the rail 12. The brackets 34 and 36 and wheels 30 and 32 are arranged to support at least a portion of the weight of the carriage 28 when it is in the lowered position. In fact, it has been found desirable to employ springs or air cylinders etc. for applying a substantial amount of the test vehicle weight to the carriage 28 to more firmly force it onto the rail 12.

Each wheel 30 and 32 includes a radial flange that rides against the gauge 22 and maintains the wheel and therefore the carriage 28 precisely aligned with the rail 12. Normally the wheels 30 and 32 are skewed or "toed-in" by about 15°. This, in combination with the added weight, insures more accurate alignment of the carriage 28 with respect to the rail 12.

The induction portion 24 of the system 10 (FIGURE 8) includes a generator 37 for producing a separate current for each rail. By way of example these currents may be on the order of up to several thousand amperes each. The opposite sides of the generator 37 are coupled to sets of brushes 38 and 40 that are mounted on the carriage 28 to travel along the rails 12.

Although the brushes 38 and 40 may be mounted on any portion of the carriage 28, in this embodiment they are carried on the after portion thereof. The brushes in the first or leading set 38 are mounted on a plurality of arms that swing downwardly. The arms are spring biased so as to maintain the brushes compressed against the surface of the head 20 of the rail 12 as the carriage 28 is traveling in a forward direction. The brushes in the second set 40 are mounted in a second set of arms that extend downwardly from a second support on the carriage 28. These brushes 40 are also spring biased against the surface of the head 20.

The brushes in the two sets 38 and 40 are separated from each other by some preselected distance on the order of 3 to 6 feet. This distance should be as short as possible in order to test close to the end of the rail. However, it should be sufficiently long to permit the current disturbances in the regions of the brushes 38 and 40 to dissipate before they reach the center of the segment 42 between the brushes 38 and 40. In order to assist in stabilizing the current a preconditioning generator 41 may be coupled to preliminary brushes 43 on the forward end of the carriage 28.

As the brushes 38 and 40 slide along the rails 12 the currents circulate in the rail segment 42 between the brushes 38 and 40. Each of these currents produce magnetic flux fields that extend circumferentially around the head 20 and the rails 12. If the rail 12 is uniform the currents and resultant flux fields in the region midway between the brushes 38 and 40 will remain substantially constant even though the brushes, etc., are traveling along the rail 12. However, if a discontinuity is present in the segment 42 between the brushes, the flow pattern of the current will be disturbed. This in turn causes a distortion in the flux field surrounding the segment 42.

In order to sense these distortions in the flux fields one or more inductive pickups 44 having means such as a small coil 46 are mounted on a downwardly extending support 48 midway between the brushes 38 and 40. The pickup 44 is positioned close to the rail 12 and within the surrounding flux field. As a result the pickups 44 will pass through any field distortions and produce a corresponding current signal in the coils 46.

The pickup 44 is electrically connected to suitable detecting means 50. The detecting means 50 are responsive to the currents produced in the pickups 44 as a result of defects. The detecting means 50 are effective to produce suitable indications, alarms etc., to alert the operator to any defects that may be present in either of the rails 12.

The ultrasonic portion 26 (also shown in FIGURE 8) includes two search units 52 and 54 for each rail 12. The search units 52 and 54 are acoustically coupled to the rails 12 and electrically coupled to several ultrasonic test channels. These channels include one or more pulse generators that trigger the search units 52 and/or 54 and cause pulses of ultrasonic energy to be intermittently transmitted into the rail. The channels also include one or more receivers that are responsive to the echoes received by the search units and produce suitable alarms, indications etc., to alert an operator to the presence of any defects.

The present ultrasonic portion 26 of the test system 10 is substantially identical to that disclosed and claimed in copending application Ser. No. 386,534, entitled, Ultrasonic Inspection, and filed July 31, 1964, in the name of Gerald de G. Cowan and assigned of record to Automation Industries, Inc. The structure and operation of this portion 26 will be described in somewhat more detail subsequently. Accordingly, it will suffice at this point to merely state that for each rail it includes a forward channel 56, a center channel 58, a rear channel 60 and a transverse channel 62 together with a forward search unit 52 and a rear search unit 54. The two search units are electrically connected to these channels so as to respond to the electrical signals therefrom and to supply electrical signals thereto whereby the defects in the rail 12 are detected.

The ultrasonic search units 52 and 54 may be mounted on any portion of the carriage 28. However, it has been found that as the brushes 38 and 40 slide over the rails 12 they frequently produce metal slivers etc. and these interfere with the operation of the ultrasonic equipment. Accordingly, the search units 52 and 54 are positioned on the forward position of the carriage 28 in front of the induction portion 24.

All of the search units 52 and 54 which may be substantially identical to each other are of the so called wheel variety. Each unit includes a pair of substantially vertical brackets 64 and 66 having an axle assembly 68 extending therebetween. The upper ends of the brackets 64 and 66 are secured to a plate 70 which is in turn bolted to a platform 72.

The front and rear sides of the platform 72 ride on mating ways 74 formed on the edges of a pair of guide members 76 extending transversely of the carriage 28, i.e., normal to the rail 12. A plurality of control levers 78 may be manipulated to firmly lock the platform 72 in a fixed position or to release the platform 72 whereby it may slide along the ways 74.

The guide members 76 are firmly mounted on a frame 80 so as to be carried thereby. The frame 76 in turn is slideably mounted on a cross bar 82 carried by and extending transversely of the carriage 28. A clamp 84, carried by frame 80, surrounds the bar 82 and locks the frame 80 in position when nuts 86 are tightened.

A search wheel 88 is rotatably mounted on the axle assembly 68 by means of ball bearings so as to be free to rotate thereon. A plurality of transducers are mounted on the axle assembly 68 so as to be carried inside of the wheel 88. These transducers are adapted to transmit ultrasonic energy in response to an electrical signal and to produce an electrical signal in response to ultrasonic energy incident thereon.

A resilient tire 90 has its sidewalls 92 clamped onto the wheel 88 whereby the tread 94 surrounds the transducers and rolls along the top of the rail head 20. As may be seen in FIGURE 5 and in the isometric view of FIGURE 4, the portion of the tread 94 which engages the head 20 tends to spread across the surface of the head and forms what is sometimes referred to as a "flat" 96.

The transducers are so positioned as to be aimed at this "flat" 96 to transmit the ultrasonic energy at the "flat" and to receive energy therefrom. The wheel 88 is filled with a coupling fluid 110 whose acoustic impedance approaches the tire material and is coupled with the "flat" 96.

When the tire is completely filled with the liquid 110 and particularly when the wheel is at rest and heavily loaded, a certain amount of pressure is developed in the fluid. This pressure tends to cause leakage of the fluid 110 past the bearings. Accordingly, it has been found desirable to provide a seal 89 between the wheel and axle 68. This seal 89 includes a pair of lips 91 that are compressed against the axle and wheel by the fluid 110. Thus the fluid flow along the axle will increase the effectiveness of the seal and prevent any leakage.

It has also been found that when the wheel is rotating at high speeds the centrifugal forces cause the tire and fluid 110 to expand radially whereby a vacuum develops in the center of the wheel. This in turn tends to cause air to flow along the axle and into the fluid 110 whereby the effectiveness of the fluid 110 is reduced. In order to avoid this difficulty the seal may be bidirectional, i.e., prevents leakage in both directions. In the present instance this is accomplished by providing a second set of flexible lips 93 that are compressed into position by the air pressure.

The tread 94 is preferably substantialy cylindrical and of uniform thickness. The "flat" 96 will then couple ultasonic energy therethrough and into the rail 12 without any material distortion.

Although a wide variety of materials may be employed in the tire 90 it has been found advantageous for the material to have several characteristics. First of all the material should have a low acoustical attenuation, i.e., sonic energy may propagate therethrough with very little loss. Secondly, the acoustical impedance, should be very close to the acoustical impedance of the coupling liquid inside the tire. Thirdly, the acoustical attenuation and impedance should remain substantially constant over a wide range of temperatures.

It has been found that during normal operating conditions the temperature of the tire 90 may suddenly change over a wide range as a result traveling from a warm sunlight area into a cool shaded area (for example in a deep cut, tunnel, etc.). If the characteristics of the tire material suddenly vary in this manner the effectiveness of the test will be drastically reduced or completely eliminated.

Polyurethane plastics with a Moca catalyst are well suited for this purpose as their acoustical characteristics are satisfactory and reasonably uniform over the normal operating range of temperatures. By way of example, the tire is normally made of Adiprene-L such as currently supplied by Nichols Engineering. As the carriage 28 travels along the rail 12 there is a tendency for the height of the axle 68 above the rail 12 to vary. This motion results from several factors such as the head 20 of the rail being irregular, portions of the rail 12 rising above the ties, misalignment of the abuting rail ends, swaying of the test vehicle etc. As this height varies the rolling radius of the tire 90 varies and the amount of pressure on the tire varies. This in turn causes the "flat" 96 to vary.

In order to prevent variations in the "flat" 96 effecting the ultrasonic energy passing therethrough, means are provided to control the size, shape and position of the "flat" 96. The tread 94 is made sustantially cylindrical whereby the "flat" 96 extends substantially the full width of the tread. A plurality of ribs 98 are placed between the wheel 88 and the platform 72 to insure enough pressure on the wheel 88 to make the "flat" 96 extend completely across the tread 94. The resultant "flat" 96 has a generally elliptical shape with a minor axis C equal to the width of the tread 94 and a major axis D extending circumferentially of the tread 94.

In order to reduce or eliminate these effects the sidewalls 92 include reinforcing means to control the shape of the tread 94. The present reinforcing means are in the form of ribs 98 molded into the peripheral portions of the sidewalls 92 at a slight angle to the radial. The ribs 98 extend from approximately the edge of the tread 94 into the center region of the sidewall 92.

The ribs 98 stiffen the periphery of the sidewall 92 against bowing in or out. This tends to effect the shape of the tread 94 when the sidewall tends to flex. More particularly as the rolling radius varies and the tire 90 changes shape, a force is imposed on the edge of the tread 94 that opposes the bending of the tread. As a result the "flat" 96 is maintained uniform with the minor axis C always equal to the width of the tread.

It can be appreciated that when the rolling radius changes something must give. This is accommodated by the major axis D varying. When the rolling radius is large the major axis is small and equal to D. When the radius is small the major axis increases and equals D'. However, during both conditions the minor axis C is the same. As a consequence the "flat" 96 is always sufficiently large to insure a distortion free coupling of the energy.

Each search wheel includes three separate transducers 100, 102 and 104 that are mounted on the axle assembly 68 so as to be carried inside of the wheel. The transducers are focused on the "flat" 96 so as to transmit ultrasonic energy therethrough. One transducer 102, i.e., the center transducer, is positioned to transmit a beam of ultrasonic energy through the "flat" 96 and vertically downwardly into the rail 12 and to receive any echoes. If the rail 12 is free from any defects the beam will penetrate to the bottom 16 of the rail 12 and be reflected therefrom. However, if there is a discontinuity in the rail 12, the energy will be reflected from the discontinuity and will not reach the bottom 16. It may thus be seen that if an echo is received at a time corresponding to the distance to the bottom 16, the wheel 88 is acoustically coupled to the rail 12 and the rail 12 is presumably free of defects.

Each wheel 88 also includes a second transducer 100 effective to transmit a beam of ultrasonic energy through the "flat" 96 and into the rail 12 whereby it travels through the rail at some preselected angle such as 37°. One of these beams, for example the beam from the front unit 52 is directed forwardly while the other beam, i.e., the one from the rear unit 54, is directed rearwardly. These two beams thus scan the rail 12 at two different angles whereby a crack parallel to one beam will be at almost ninety degrees to the other beam. If there is a defect in the rail one or both of the second transducers will receive an encho depending upon the orientation of the defect relative to the directions of the beams. The magnitude of the echo, i.e., weak or strong, is also dependent upon the orientation of the defect.

The third transducers 104 are also mounted to transmit beams of ultrasonic energy through the "flat" 96 for travel through the rail 12 at some preselected angle such as 70°. Both of the third transducers 104 are positioned to direct ultrasonic beams toward the other wheel whereby the third beams are reflected from inside the rail toward the third transducer 104 in the other search unit. If the head 20 and the junction between the head 20 and web 18 are free of any discontinuities, the ultrasonic energy from one of the 70° crystals 104 will be reflected to the other 70° crystal 104 and no echoes will be received by the transmitting transducer.

The first and second transducers 102 and 100 (i.e., the 0° and the 37° transducers) in the forward search unit are coupled to the forward and center channels 60 and 58 while the first and second transducers 100 and 102 in the rear search unit are coupled to the rear and center channels 56 and 58. The third or 70° transducers 104 in the two search units are coupled to the transverse channel 62.

The four channels cause the transducers to transmit ultrasonic pulses and respond to the various signals or absence of signals produced by the transducers as a result of receiving echoes from the pulse. The channels 56 to 60 then indicate the various types of defects. More particularly, if the vertical or 0° transducers 102 are receiving echoes from the bottom 16 of the rail 12 while one of the 37° transducers 100 are receiving echoes, there is presumably a defect present. Presumably the defect is of one variety if the echoes are weak and another variety if the echoes are strong. In the event echoes are not being received from the bottom 16 of the rail 12 and echoes are being received by a second transducer 102 another type of defect is presumably present depending upon whether the 37° echoes are strong or weak. If the energy from one of the 70° transducers 104 does not travel through the head 20 so as to be reflected from the bottom 16 of the head 20 to the second 70° transducer 104, presumably there is a defect in the head 20. Since the channels 56 to 62 are responsive to the various combinations of signals they will produce indications as to the probably type of defects.

In order to acoustically couple the 100, 102 and 104 on axle assembly 68 to the "flat" 96 the tire 90 is filled with a liquid couplant 110 such as water. This will permit the ultrasonic energy in the various beams to be transmitted across the wheel 88, through the "flat" 96 and into the rail 12 without any material distortion. In order to improve the acoustical coupling between the "flat" 96 and the head 20 of the rail 12 it has been found desirable to provide a liquid couplant such as water. In the present instance this is accomplished by providing a nozzle 106 immediately in front of the wheel 88 whereby water is sprayed directly onto the tread 94 and/or the head 20. As the wheel 88 travels along the rail 12 it will roll over this water and form a thin film 108 of water between the tread 94 and the head 20 of the rail 12.

It can be appreciated that as the wheel 88 rotates the "flat" 96 travels along the tread and the water 110 inside of the wheel 88 is displaced and flows around the inside of the tire 90. A considerable amount of energy is required to rotate the wheel 88 particularly at high speeds. It has been found that the friction of the bearings etc. rotating and the internal friction of the circulating fluid may become larger than the friction between the tread 94 and rail 12, particularly when there is a film of liquid couplant between the tread 94 and 12. In this regard it is to be noted that the tread 94 must be smooth and free of any antiskid irregularities or projections, etc. When this occurs the wheel 88 stops rotating and merely planes or skids on top of the liquid film.

In the present instance this phenomenon is avoided by increasing the amount of friction between the tire 90 and the rail 12. This is accomplished by providing at least one annular rib 112 which projects beyond the tread 94 and rolls on the head 20 of the rail 12. This rib 112 has a relatively small area and forms a high pressure contact with the rail 12. As a consequence there will be no water between the rib 112 and the rail 12 and it is vertually impossible for the wheel 88 to stop rotating and the rib 112 to skid.

It has also been found the downward pressure on the wheel 88 causes the tread 94 to act like a squeegee whereby the water in the film 10 flows laterally from the sides of the "flat" 96. This results in a large portion of the water between the "flat" 96 and the head 12 being lost. This in turn requires an excessive amount of water being consumed and/or an adequate film 108 of coupling water is not maintained.

In order to avoid the foregoing difficulty a pair of annular ribs 112 and 114 are provided. The ribs 112 and 114 are on each side of the tread 94 so as to straddle the "flat" 96. The combination of the two ribs 112 and 114 provides the desired high pressure contact to insure rotating of the tire 90. At the same time dams are formed on the opposite side of the "flat" 96. As a consequence the water is trapped between these two ribs 112 and 114 and an adequate liquid film is always maintained between the "flat" 96 and the rail 12.

In order to use the present system for inspecting a rail 12, the carriage 28 is initially lowered onto the rail 12 with the guide wheels 30 and 32 positioned on the head 20 and the flange tight against the field 22. This is the position that the carriage 28 will maintain as it travels on the rail 12 during a test. Both sets of brushes 38 and 40 are spring biased against the head 20. Their position adjusted to align them with the head 20 whereby proper electrical contact is maintained. At the same time the positions of the support 48 and/or the inductive pickups 44 thereon are adjusted until the pickups 44 are immediately over the head 20 and in the magnetic field surrounding the rail 12.

The height of the stack of ribs 98 are adjusted to provide the desired amount of pressure on the wheel search unit for maintaining the minor axis C of the "flat" 96 equal to the full width of the tread 94. If necessary the nuts 86 are loosened and the frame 80 moved on the cross-bar 82 until the wheels 88 are laterally positioned in alignment with the rail 12. After the wheels 88 are laterally positioned the nuts 86 are tightened and the frame 80 locked in a fixed aligned position. Following this the levers 78 may be manipulated to release the platforms 72 whereby they may be moved laterally along the ways 74 in the sides of the guides 76. The ways 74 are substantially concentric with the center 116 of the "flat" 96 face or of the rail head 20. By moving in this manner, the axle assembly 68 and various transducers 100, 102 and 104 thereon to rotate about the point 116 of incidence of the ultrasonic beams on the rail 12. As a result the beams can be aligned with the web 18 without disturbing the lateral position of the wheels.

The axle assembly 68 may be released by loosening the lock nuts 118 to allow the axle 68 to rotate. The lever 120 may then be manipulated until the center ultrasonic beam extends vertically downwardly through the rail substantially normal to the bottom surface. This condition is satisfied when the magnitude of the echoes received by the center transducer is a maximum. Since all of the transducers 100, 102 and 104 are mounted on the axle assembly 68 in a predetermined fixed relation, when the vertical transducer is properly positioned the two angular transducers are also properly positioned.

After the various wheel search units and transducers have been properly positioned with respect to the rails the nuts 122 (FIG. 2) may be released so as to allow the plate 70 for the rear search units to be moved fore and aft until the ultrasonic energy transmitted by one of the 70° transducers 104 is reflected from the inside of the head 20 to the other 70° transducer 104. It will thus be seen that the various search units can all be easily adjusted and properly aligned with the rail and each other.

Following these adjustments the test vehicle may be driven along the track with each of the carriages 28 moving over its respective rail 12. Since the flanged wheels 30 and 32 will roll on the head 20 and will be tightly compressed against the gauge 22 the carriage 28 will also be precisely aligned with the rail 12. In addition the various search units, etc., carried by the carriage 28 will also be precisely aligned with the various portions of the rail 12. Normally once the carriage 28 etc. have all been properly adjusted they will be capable of traveling on the rail with no further adjustments. However, in the event of a major change in the dimensions of the rail it will be possible to very quickly and simply readjust the various search units etc. so as to maintain them properly aligned.

During the course of the search operation the nozzles 106 will direct the streams of water on the tread 94 and/or rail 12 so as to form a liquid film 108 between the "flat" 96 and the head 20. Since the two ribs 112 and 114 on the opposite sides of the "flat" 96 are compressed tightly against the rail 12 they will insure the wheel 88 rotating and will prevent the loss of water whereby all of the transducers 100, 102 and 104 are acoustically coupled to the rail 12. In the event the space between the axle assembly 68 and the head 20 varies, the rolling radius of the wheel 88 will also vary. Due to the shape of the tread 94 and the reinforcing ribs 98 in the sidewalls 92 the minor axis of the "flat" 96 will remain substantially constant. Any variations will appear only as a change in the major axis of the "flat." However, the "flat" 96 will always be maintained precisely aligned with the point of incidence of the beams and also its size will be in excess of the minimum required for a complete coupling of all of the ultrasonic energy from the wheel to the rail and from the rail to the wheel.

It will thus be seen that a new and improved rail testing system has been provided which will insure both the ultrasonic and induction portions of the system always being properly coupled to the rail.

I claim:

1. A nondestructive testing device of the class described for inspecting a workpiece, said device including the combination of
   an axle assembly,
   a wheel rotatably mounted on the assembly,
   a tire member having a pair of sidewalls and a tread, said sidewalls being mounted on the wheel to rotate therewith, and effective to flex as the rolling radius of the tire varies, said tread being effective to engage and roll across the surface of a workpiece, the portion of the tread engaging the surface of the workpiece forming a substantially elliptical "flat" having one axis parallel to the axle assembly, a plurality of ultrasonic transducers disposed inside of the wheel and mounted on the axle assembly and carried thereby, all of said transducer being focused one the "flat,"

a coupling liquid inside of the tire and acoustically coupling the transducers to the "flat," and a plurality of ribs on said sidewalls reinforcing the sidewalls against flexing thereof as the rolling radius of the tire varies, said ribs being effective to maintain the minor axis of the "flat" substantially constant when the sidewalls flex.

2. A nondestructive testing device of the class described for inspecting a workpiece, said device including the combination of an axle assembly, a wheel rotatably mounted on the assembly, a tire member mounted on the wheel to rotate therewith, said tire member having a pair of radial sidewalls and a tread, said tread being effective to roll upon the surface of the workpiece, the portion of the tread engaging the surface forming a "flat,"

at least one ultrasonic transducer disposed inside of the wheel and mounted on the axle assembly and carried thereby, said transducer being acoustically coupled to the portion of the tire member in contact with the workpiece, and a plurality of ribs on said tire reinforcing the sidewalls so as to reduce flexing thereof as the rolling radius of the tire varies and maintains at least one dimension of the "flat" constant.

3. A nondestructive testing device of the class described for inspecting a workpiece, said device including the combination of a wheel for rotating about the axis thereof, a resilient tire, of a flexible material transparent to ultrasonic energy, a pair of sidewalls in said tire attached to the wheel to rotate therewith and adapted to flex as the rolling radius varies, a tread effective to roll on the surface of the workpiece, the portion of the tread in contact with the workpiece forming a substantially elliptical "flat,"

at least one ultrasonic transducer mounted inside of the tire member and focused on the "flat,"

a coupling liquid in said ire acoustically coupling the transducers to the flat, and reinforcing means in the sidewalls of said tire, said reinforcing means being effective to increase the stiffness of the sidewalls and maintain the minor axis of the "flat" substantially constant.

4. A nondestructive testing device of the class described for inspecting a workpiece, said device including the combination of a wheel for rotating about the axis thereof, a resilient tire of a flexible material transparent to ultrasonic energy and including a pair of sidewalls and a tread, said sidewalls being attached to the wheel to rotate therewith and to flex as the rolling radius varies, said tread being effective to roll on the surface of the workpiece, the portion of the tread in contact with the workpiece forming a "flat,"

at least one ultrasonic transducer mounted inside of the wheel and focused on the "flat" and acoustically coupled to the portion of the workpiece in contact therewith, and reinforcing means in the sidewalls of said tire, said reinforcing means being effective to increase the stiffness of the sidewalls and maintain the dimension of the "flat" parallel to the axis of rotation substantially constant.

5. A nondestructive testing device of the class described for inspecting a workpiece, said device including the combination of a wheel for rotating about the axis thereof, a tire member mounted on the wheel for rotating therewith, a pair of sidewalls on said tire, said sidewalls being effective to flex as the rolling radius of the tire varies, a tread on said sidewalls to engage the workpiece and roll thereacross, the portion of said tread engaging said workpiece forming a substantially elliptical "flat," the minor axis of the ellipse being parallel to the axis of rotation and substantially equal to the width of the tread, a plurality of ultrasonic transducer mounted inside of the wheel, all of said transducers being focused on the 'flat' and coupled to the portion of the workpiece in contact therewith, and means in said sidewalls of said tire for maintaining the minor axis of the "flat" substantially constant as the rolling radius varies.

6. A nondestructive testing device of the class described for inspecting a workpiece, said device including the combination of a wheel for rotating about the axis thereof, a tire member mounted on the wheel and including a pair of sidewalls and a tread, said tread being effective to roll on the surface of the workpiece and form a "flat" at the area of contact, the sidewalls being resiliently deformable as the rolling radius of the tire varies, at least one ultrasonic transducer mounted inside of the wheel, said transducer being focused on the "flat" and acoustically coupled to the portion of the workpiece in contact with the "flat," and means in said sidewalls for maintaining at least one dimension of the "flat" substantially constant as the rolling radius varies.

7. A nondestructive testing device of the class described for inspecting a workpiece, said device including the combination of an axle assembly, a wheel rotatably mounted on said axle assembly, a tire member mounted on the wheel to rotate therewith, said tire member having a tread for rolling engagement with the surface of the workpiece, at least one ultrasonic transducer disposed inside the wheel and mounted on the axle assembly and carried thereby, said transducer being acoustically coupled to the portion of the tread engaging the workpiece, coupling means having a discharge outlet positioned adjacent the tread for supplying a liquid couplant thereto, said couplant being effective to form a film between the tread and the workpiece, and a rib on the tread of said tire engaging the surface of the workpiece and trapping a film of liquid between said portion of the tread and workpiece.

8. A nondestructive testing device of the class described for inspecting a workpiece, said device including the combination of a support for being positioned adjacent to the workpiece and traveling thereacross, a wheel rotatably mounted on said support, a tire mounted on said wheel for rotating therewith, said tire member having a tread for rolling contact with the surface of the workpiece, as the support travels across the workpiece the portion of the tread engaging the surface of the workpiece forming a "flat,"

at least one ultrasonic transducer mounted on said support and acoustically coupled to the "flat,"

coupling means mounted on said support and positioned adjacent the tread, said coupling means being effective to form a film of liquid couplant between the "flat" and the workpiece, and sealing means on the tire adjacent the opposite sides of the tread, said sealing means forming a rolling contact with the work surface on the opposite sides of the "flat" to trap the film of liquid couplant.

9. A nondestructive testing device of the class described for inspecting workpiece, said device including the combination of
- a tire having a tread for rolling contact with the surface of the workpiece, the portion of the tread engaging the workpiece forming a "flat,"
- at least one ultrasonic transducer mounted inside of the tire member and acoustically coupled to the "flat,"
- means for supplying a coupling liquid between the "flat" and the surface of the workpiece to form a film that couples the "flat" to the portion of the workpiece in contact therewith, and
- a pair of annular ribs on the opposite edges of the tread for engaging the surface of the workpiece, said ribs forming a pair of high pressure rolling contacts on the opposite sides of the "flat" for trapping a film of coupling liquid therebetween.

10. A nondestructive testing device of the class described for inspecting workpiece, said device including the combination of
- a tire having a tread for rolling contact with the surface on the workpiece,
- at least one ultrasonic transducer mounted inside of the tire member and acoustically coupled to the portion of the tread in contact with the workpiece,
- means for supplying a coupling liquid between the tread and the surface of the workpiece to couple said portion to the workpiece, and
- projections on the tread for engaging the surface of the workpiece, said projections being positioned to trap the film of coupling liquid therebetween.

11. A nondestructive testing device of the class described for inspecting a workpiece, said device including the combination of
- a rotatably mounted wheel,
- a resiliently deformable tire mounted on said wheel for rotating therewith,
- a tread on said tire for rolling contact with the surface of the workpiece, the portion of said tread engaging said workpiece forming a "flat,"
- at least one ultrasonic transducer mounted inside of said wheel and focused on said "flat,"
- a liquid couplant in said tire, said couplant acoustically coupling the transducer with said "flat," and
- a pair of annular ribs projecting from the opposite edges of the tread to form a high pressure rolling contact with the surface of the workpiece.

12. A nondestructive testing device of the class described for inspecting a workpiece, said device including the combination of
- a rotatably mounted wheel,
- a tire member mounted on the wheel to rotate therewith said tire member having a tread for rolling on the surface of the workpiece, the portion of the tread in engagement with the surface of the workpiece being acoustically coupled thereto,
- at least one ultrasonic transducer mounted on the wheel and carried thereby, said transducer being acoustically coupled to the portion of the tread engaging the workpiece, and
- at least one rib on the tread of said tire for forming a high pressure rolling contact with the surface of the workpiece.

References Cited

UNITED STATES PATENTS

| | | | |
|---|---|---|---|
| 2,067,788 | 1/1937 | Putnam | 152—209 XR |
| 2,740,090 | 3/1956 | Dionne. | |
| 2,992,553 | 7/1961 | Joy | 73—67.8 |
| 3,028,751 | 4/1962 | Joy | 73—67.7 XR |
| 3,079,953 | 3/1963 | Mounteer. | |
| 3,205,702 | 9/1965 | Joy | 73—67.7 XR |
| 3,218,846 | 11/1965 | Joy | 73—67.8 XR |

RICHARD C. QUEISSER, *Primary Examiner.*

JOHN R. FLANAGAN, *Assistant Examiner.*